Figure 1:
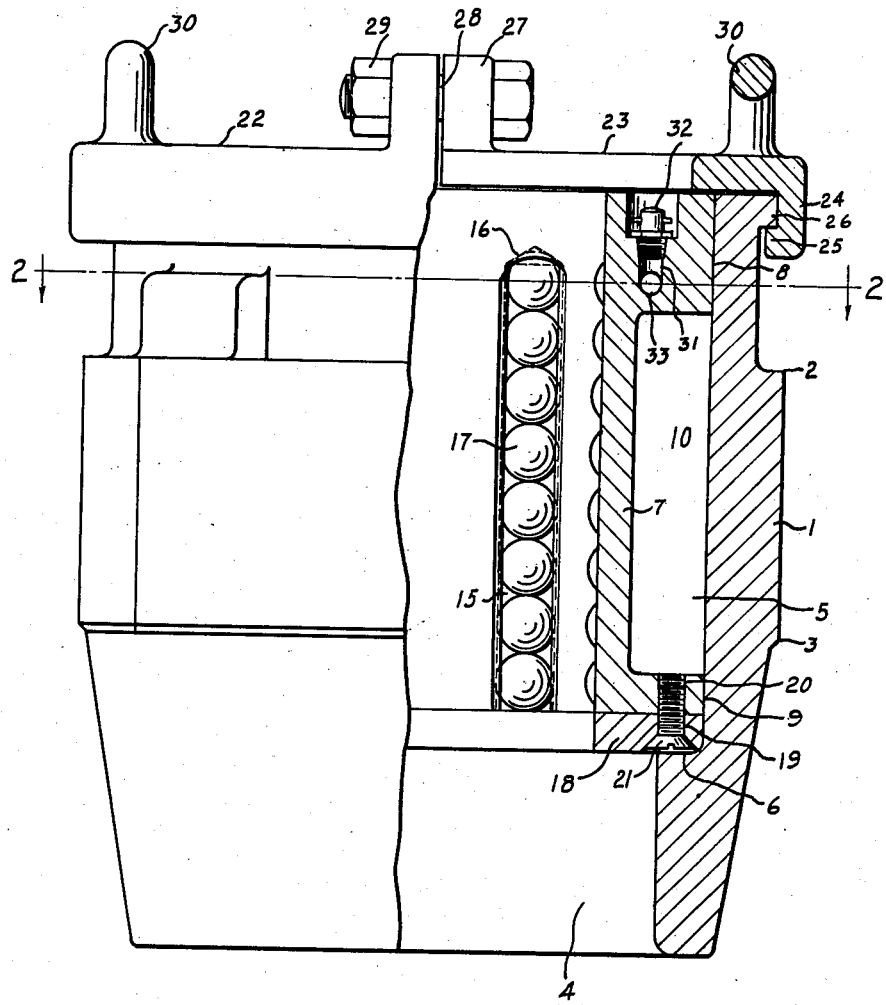

May 30, 1939.　　　A. PRANGER　　　2,160,516
BUSHING FOR ROTARY TABLES
Filed April 30, 1937　　　2 Sheets-Sheet 1

INVENTOR.
Albert Pranger
BY
H W Baker
ATTORNEY.

May 30, 1939.  A. PRANGER  2,160,516
BUSHING FOR ROTARY TABLES
Filed April 30, 1937  2 Sheets-Sheet 2

INVENTOR.
Albert Pranger
BY H. W. Baker
ATTORNEY.

Patented May 30, 1939

2,160,516

UNITED STATES PATENT OFFICE 2,160,516

BUSHING FOR ROTARY TABLES

Albert Pranger, Dallas, Tex., assignor to The Guiberson Corporation, Dallas, Tex., a corporation of Delaware Application April 30, 1937, Serial No. 139,960

3 Claims. (Cl. 255—23)

This invention relates to a body or bushing adapted to be used in conjunction with a rotary table, and through which body or bushing the kelly passes, and in particular relates to ball bearings or anti-friction bearings therefor.

The body or bushing is inserted in the conventional master bushing of a rotary table, which is rotated by well known means. As the drilling proceeds and the kelly passes downwardly through the body, considerable friction has heretofore taken place. The object of this invention is to eliminate this friction as far as possible by providing ball bearings between the kelly and the body. I have also provided means whereby the said ball bearings may be lubricated. Another object of the invention is to provide a very strong compact assembly which may be readily assembled or disassembled. In the construction shown in the drawings, it is well nigh impossible for any of the parts to be broken, but I have provided means whereby, if any parts should be broken, the same would not readily fall into the well.

Figure 2:
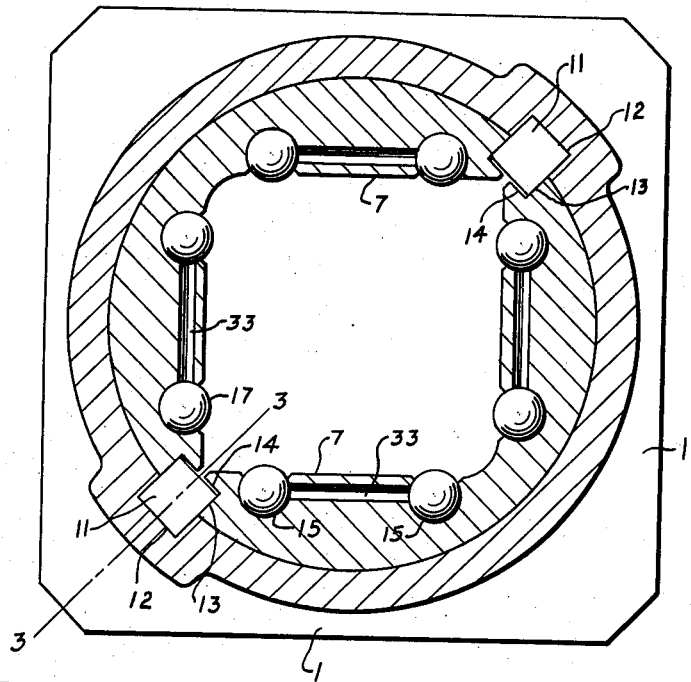
Figure 3:
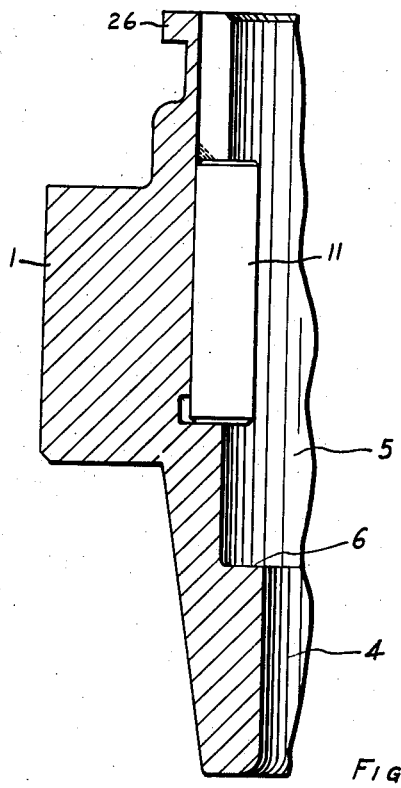

These and other objects will appear in the detailed specification and claims which follow. Referring to the drawings, Fig. 1 is a side elevational view with certain of the parts partly broken away so as to show the interior mechanism or construction of the interior parts. Fig. 2 is a plan cross-sectional view on the line 2—2 of Fig. 1. Fig. 3 is a vertical sectional view taken on the line 3—3 of Fig. 2, with the cages removed.

The body or bushing 1 has an exterior, which is partly circular and partly a square or other flat sided figure, to conform to the shape of the master bushing. The flat sided part extends, as shown in Fig. 1, from a point designated by the numeral 2 to a point designated by the numeral 3, and the remainder of the outside parts are circular. The part of the body between the numerals 2 and 3 would be the part which is seated in the master bushing, so that when the master bushing is rotated, the body 1 will likewise rotate. The body 1 is provided with a circular vertical passage way 4 and a larger orifice 5, the said orifice 5 terminating at its lower end in a shoulder 6, which extends to the circumference of the passage way 4.

Two cages 7 extend within the orifice 5. Each of these cages is bounded by outer semicircular surfaces 8 and 9, which fit against the inner periphery of the body 1 and within the orifice 5. Each of these cages 7 is provided with an external orifice 10, so as to lighten the weight of the parts. The inner surface of each of the cages 7 is one-half of a square provided the kelly is square, or if the kelly has any other number of flat sides, each of the cages would have one-half of that number of flat sides. It is not essential that each of the cages should have precisely one-half the number of sides as the kelly. If the kelly should be a five-sided figure, it would be satisfactory to make the cages so that one would have three sides and the other two sides or faces, or it would be satisfactory, in case the kelly had any uneven number of faces, to make each cage with only a sufficient number of faces to insure that the kelly would be turned. For instance, suppose the kelly had five sides. It would be possible to make two cages with each having two sides, with nothing on the fifth side, or it would be possible to make the cages so that each would have two faces corresponding to two of the faces of the kelly, and on the fifth side of the kelly, each cage could extend over one-half of the same. The essential point to be borne in mind is that there must be a sufficient number of inner faces on the cages to insure that the kelly is turned. Practically all flat sided kellys are square in cross-section, and I have found that the most suitable arrangement when a square kelly is employed is to provide two cages, each having two inner surfaces.

Two steel keys 11 are welded preferably diametrically opposite each other into grooves 12 in the body 1. When the cages are inserted between the steel keys 11 they make a snug fit therewith, the key 11 engaging a shoulder 13 on the cage 7, and the cage 7 being provided with a flange 14 partly overlying the said key.

In each of the cages I drill a plurality of round holes 15, which holes extend upwardly through the cages and terminate in a seat 16, so as to limit the upward movement of balls 17 which are inserted in the said holes. Underlying the holes 15 are two semicircular rings 18, which prevent the balls from passing downwardly out of the holes 15. The rings 18 and cages 7 are provided with holes 19 and 20 respectively, which receive screws 21, and which screws serve as a means to hold the rings against the undersurface of the cages. The bottom of the screws 21 rests on the shoulder 6, so that the said screws cannot work out and drop into the well or cannot release the rings 18.

Two semicircular cover plates or rings 22 and 23 are provided which overly the upper ends of the cages 7 and the body 1, and each of these cover plates is provided with a depending circular flange 24 having an underlip 25, which lip underlies a flange 26 on the upper end of the body 1. Each of the cover plates or rings is provided with upstanding ears 27, provided with conventional bores through which passes a headed bolt 28 terminating in a nut 29. The cover plates are also provided with lifting ears 30.

In assembling the parts, the cages 7 are turned upside down and the balls are inserted in the holes 15. The rings 18 are then placed on the cages and the screws 21 are inserted. The cages are then turned so that the rings 18 would be at the bottom, and each of the cages is inserted in the body 1. The cover plate is then placed over the top of the assembly and is tightened into position by means of the bolts 28 and nuts 29.

It is of course understood that the surface of the balls next to the kelly projects slightly beyond the inner surface of the cages, so that it is the balls that contact the kelly, thereby producing a structure which will eliminate or at least materially reduce the normal friction between the kelly and its bushing.

In order to keep the balls properly lubricated, I have provided a channel 31, extending a short distance downwardly through the upper part of each of the cages, which passage way is capped by the conventional cup 32. Each of the channels 31 communicates with a channel 33, which extends horizontally between the two holes 15, adjacent thereto. The lubricating means would therefore pass downwardly through the channel 31 into the channel 33, and then would be led to the adjacent holes 15, in which the balls are positioned, so that the balls would be thoroughly lubricated.

I realize that many changes may be made in the specification form of the invention as shown by way of illustration in this application without departing from the spirit of the invention, and I therefore reserve the right to make such changes therein as may fairly fall within the scope of the appended claims. Having now described my invention, I claim:

1. In combination, a bushing body having diametrically opposite channels, a key in each of said channels and welded to said body, a plurality of cages inserted in said body between and engaging said keys, and ball bearings carried by said cages and extending into an orifice extending through said body.

2. In combination, a bushing body, a plurality of cages inserted in said body, said bushing body being provided with a plurality of vertical channels, keys in said channels and extending between the ends of said cages so as to cause said cages to turn with said body, each of said cages being provided with a plurality of vertically extending channels having an opening less than the diameter of said channels, and communicating with the space between the inner faces of said cages and extending from the bottom of said cages to a point below the upper end of said cages, ball bearings in said channels in the cages, a ring secured to the lower end of said cages and serving as a means to prevent the ball bearings from falling out.

3. In combination, a bushing body, a plurality of cages inserted in said body, said bushing body being provided with a plurality of vertical channels, keys in said channels and extending between the ends of said cages so as to cause said cages to turn with said body, each of said cages being provided with a plurality of vertically extending channels having an opening less than the diameter of said channels, and communicating with the space between the inner faces of said cages and extending from the bottom of said cages to a point below the upper end of said cages, ball bearings in said channels in the cages, a ring secured to the lower end of said cages and serving as a means to prevent the ball bearings from falling out, and means to prevent the ring securing means from working loose.

ALBERT PRANGER.